US009630527B2

(12) United States Patent
Matsui

(10) Patent No.: US 9,630,527 B2
(45) Date of Patent: Apr. 25, 2017

(54) VEHICLE SEAT

(71) Applicants: TOYOTA BOSHOKU KABUSHIKI KAISHA, Aichi-ken (JP); SHIROKI CORPORATION, Kanagawa (JP)

(72) Inventor: Hayato Matsui, Aichi-Ken (JP)

(73) Assignees: TOYOTA BOSHOKU KABUSHIKI KAISHA, Aichi-ken (JP); SHIROKI CORPORATION, Kanagawa (JP)

(*) Notice: Subject to any disclaimer, the term of this patent is extended or adjusted under 35 U.S.C. 154(b) by 90 days.

(21) Appl. No.: 14/719,720

(22) Filed: May 22, 2015

(65) Prior Publication Data

US 2015/0336477 A1    Nov. 26, 2015

(30) Foreign Application Priority Data

May 26, 2014    (JP) .................................. 2014-107851

(51) Int. Cl.
| | | |
|---|---|---|
| A47C 7/02 | (2006.01) |
| B60N 2/16 | (2006.01) |
| B60N 2/68 | (2006.01) |
| B60N 2/72 | (2006.01) |
| B60N 2/06 | (2006.01) |

(Continued)

(52) U.S. Cl.
CPC ............ B60N 2/1615 (2013.01); B60N 2/06 (2013.01); B60N 2/165 (2013.01); B60N 2/1635 (2013.01); B60N 2/1814 (2013.01); B60N 2/1864 (2013.01); B60N 2/68 (2013.01); B60N 2/682 (2013.01); B60N 2/72 (2013.01); B60N 2/181 (2013.01); B60N 2002/0236 (2013.01)

(58) Field of Classification Search
CPC .... B60N 2/682; B60N 2/1814; B60N 2/1615; B60N 2/181; B60N 2/68; B60N 2/1635; B60N 2/72; B60N 2/06; B60N 2/1864; B60N 2002/0236
USPC .............................. 297/452.18, 344.15, 452.2
See application file for complete search history.

(56) References Cited

U.S. PATENT DOCUMENTS

| | | | | |
|---|---|---|---|---|
| 6,095,475 A | * | 8/2000 | Willms | ................ B60N 2/1615 248/421 |
| 6,502,799 B2 | * | 1/2003 | Lepaule | ............... B60N 2/1615 248/396 |

(Continued)

FOREIGN PATENT DOCUMENTS

| | | |
|---|---|---|
| DE | 10 2005 039 903 | 12/2006 |
| FR | 2 772 317 | 6/1999 |
| JP | 2013-121772 | 6/2013 |

OTHER PUBLICATIONS

Official Action, along with English-language translation thereof, for DE Appl. No. 10 2015 209 323.9 dated Aug. 2, 2016.

*Primary Examiner* — Chi Q Nguyen
(74) *Attorney, Agent, or Firm* — Greenblum & Bernstein, P.L.C.

(57) ABSTRACT

A vehicle seat includes a seat frame, a bushing having a shape of a hollow cylinder and a pipe. The pipe is fitted to the bushing and attached to the seat frame. The pipe includes a body portion having a fitting diameter different from a fitting diameter of the bushing and a fitting portion formed at an end in an axial direction of the body portion and fitted to an inner periphery or an outer periphery of the bushing. The fitting portion is formed in a diameter-reduced or diameter-increased hollow cylindrical shape that is fitted to the inner periphery or the outer periphery of the bushing.

5 Claims, 6 Drawing Sheets

(51) Int. Cl.
*B60N 2/18* (2006.01)
*B60N 2/02* (2006.01)

(56) References Cited

U.S. PATENT DOCUMENTS

| | | | | |
|---|---|---|---|---|
| 6,648,394 B2* | 11/2003 | Lejeune | ............ | B60N 2/01541 248/429 |
| 8,434,823 B2* | 5/2013 | Du | ............ | B60N 2/2252 297/354.12 |
| 8,857,913 B2* | 10/2014 | Schuhmacher | ...... | B60N 2/2356 16/2.1 |
| 8,870,293 B2* | 10/2014 | Seibold | ............ | B60N 2/68 297/452.18 |
| 2005/0127250 A1* | 6/2005 | Woodard | ............ | B60N 2/1615 248/157 |
| 2005/0168042 A1* | 8/2005 | Williamson | ....... | B60N 2/01508 297/452.18 |
| 2005/0248200 A1* | 11/2005 | Pradier | ............ | B60N 2/2222 297/378.1 |
| 2006/0071514 A1* | 4/2006 | Farquhar | ............ | B60N 2/4861 297/61 |
| 2006/0244298 A1* | 11/2006 | Runde | ............ | B60N 2/48 297/391 |
| 2008/0163453 A1* | 7/2008 | Joseph | ............ | F16F 1/373 16/2.1 |
| 2011/0121627 A1* | 5/2011 | Konagai | ............ | B60N 2/4235 297/354.1 |
| 2013/0033081 A1* | 2/2013 | Aoi | ............ | B60N 2/22 297/354.1 |
| 2013/0200675 A1* | 8/2013 | Beneker | ............ | B60N 2/0228 297/325 |
| 2014/0319893 A1* | 10/2014 | Vatmakhter | ............ | B60N 2/682 297/463.1 |
| 2015/0246624 A1* | 9/2015 | Furuta | ............ | B29C 65/48 297/344.15 |

* cited by examiner

VEHICLE SEAT

INCORPORATION BY REFERENCE

The disclosure of Japanese Patent Application No. 2014-107851 filed on May 26, 2014 including the specification, drawings and abstract is incorporated herein by reference in its entirety.

BACKGROUND OF THE INVENTION

1. Field of the Invention

The invention relates to a vehicle seat. Specifically, the invention relates to a vehicle seat in which a pipe is fitted to a bushing having a shape of a hollow cylinder and attached to a seat frame.

2. Description of Related Art

There is known a configuration in which a tubular steel pipe is bridged between side frames of a seat cushion (Japanese Patent Application Publication No. 2013-121772 (JP 2013-121772 A)). When, for example, the pipe is fittingly coupled to the side frames at portions where coupling components such as legs or lifter links are to be attached, the pipe is attached to the side frames in the following manner. That is, the coupling components are attached in advance to the side frames via hollow cylindrical bushings or the like to form assemblies, and then, the pipe is fitted into the bushings in the assembled state. Accordingly, the assemblies obtained by attaching the coupling components to the side frames in advance can be transferred to a seat assembly process where the pipe is attached to the assemblies.

SUMMARY OF THE INVENTION

However, with the technique described above, since the pipe is fitted into the hollow cylindrical bushings, the size of the pipe is limited such that the outer diameter of the pipe should be received in the inner diameter of the bushings. Since standardized bushings with a fixed size are usually used, it is not possible to enhance the strength by increasing the outer diameter of the pipe. The invention aims to enable a pipe having a different size to be attached to a bushing attached to a side frame.

One aspect of the invention is a vehicle seat in which a pipe is fitted to a bushing having a shape of a hollow cylinder and attached to a seat frame. The pipe includes a body portion having a fitting diameter different from a fitting diameter of the bushing and a fitting portion formed at an end in an axial direction of the body portion and fitted to an inner periphery or an outer periphery of the bushing, wherein the fitting portion is formed in a diameter-reduced or diameter-increased hollow cylindrical shape that is fitted to the inner periphery or the outer periphery of the bushing.

Herein, in the case of a configuration in which the pipe is fitted to the outer periphery of the bushing, "fitting diameter" represents "outer diameter" of the bushing and "inner diameter" of the pipe, while in the case of a configuration in which the pipe is fitted to the inner periphery (into the hollow cylinder) of the bushing, "fitting diameter" represents "inner diameter" of the bushing and "outer diameter" of the pipe.

According to this aspect, a pipe having a different size can be attached to a bushing attached to a side frame. That is, even if the body portion of the pipe is formed in the shape having the fitting diameter different from the fitting diameter of the bushing, since the fitting portion of the pipe, that is fittingly coupled to the bushing, is formed in the diameter-reduced or diameter-increased shape that can be fitted to the inner periphery or the outer periphery of the bushing, a pipe having a different size can be attached to the bushing.

In the above-described aspect, the body portion of the pipe may be formed in a shape having a fitting diameter greater than the fitting diameter of the bushing and the fitting portion of the pipe may have the diameter-reduced hollow cylindrical shape that is fitted to the inner periphery or the outer periphery of the bushing.

With this configuration, a pipe having high structural strength can be attached to a bushing attached to a side frame. That is, the body portion of the pipe is formed in the shape having the fitting diameter greater than the fitting diameter of the bushing. Therefore, even if the fitting portion of the pipe that is fittingly coupled to the bushing, has the diameter-reduced shape that can be fitted to the inner periphery or the outer periphery of the bushing, the pipe is attached to the bushing in the state where high structural strength can be exhibited at the body portion connected from the bushing.

In the above-described configuration, the fitting portion of the pipe may be fitted into the hollow cylinder of the bushing and the body portion of the pipe may be formed in a hollow cylindrical shape having an outer diameter greater than an inner diameter of the bushing.

With this configuration, even if the fitting portion of the pipe is fitted into the hollow cylinder of the bushing, since the body portion of the pipe is formed in the shape having the outer diameter greater than the inner diameter of the bushing, the pipe can be configured to have high structural strength.

In the above-described configuration, a plurality of lifter links for a seat lifter are rotatably coupled to a side frame of a seat cushion and to a base on a floor and the lifter links include a drive link configured to receive transmission of a rotational driving force so as to drive the other lifter link, wherein the bushing may be configured as a coupling shaft coupling the drive link to the side frame so as to be rotatable relative to the side frame. The bushing may be integrally joined to the drive link and rotatably coupled to the side frame. The fitting portion of the pipe may be inserted in the axial direction to a coupling position of the drive link in the hollow cylinder of the bushing and both end portions of a fitting area of the fitting portion may be welded to the bushing.

With this configuration, by inserting the fitting portion of the pipe in a coupling area, with the drive link, of the bushing and integrally joining the fitting portion to the bushing, the structural strength of such an area, where a large load is applied when a large load is input to the vehicle seat, can be enhanced so that the posture of the vehicle seat can be firmly held.

In the above-described configuration, the drive link may be integrally joined to a driving force transmission member via the bushing with the side frame interposed therebetween. The fitting portion of the pipe may be inserted in the axial direction to a position passing through the coupling position of the drive link and a coupling position of the driving force transmission member in the hollow cylinder of the bushing and both end portions of a fitting area of the fitting portion may be welded to the bushing.

With this configuration, by inserting the fitting portion of the pipe in coupling areas, with the drive link and the driving force transmission member, of the bushing and integrally joining the fitting portion to the bushing, the structural strength of such areas, where a torsional load is applied to the bushing relative to the drive link and relative to the driving force transmission member when a large load is input to the vehicle seat, can be enhanced so that the posture of the vehicle seat can be firmly held.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinbelow, a mode for carrying out the invention will be described with reference to the drawings.

Figure 1:
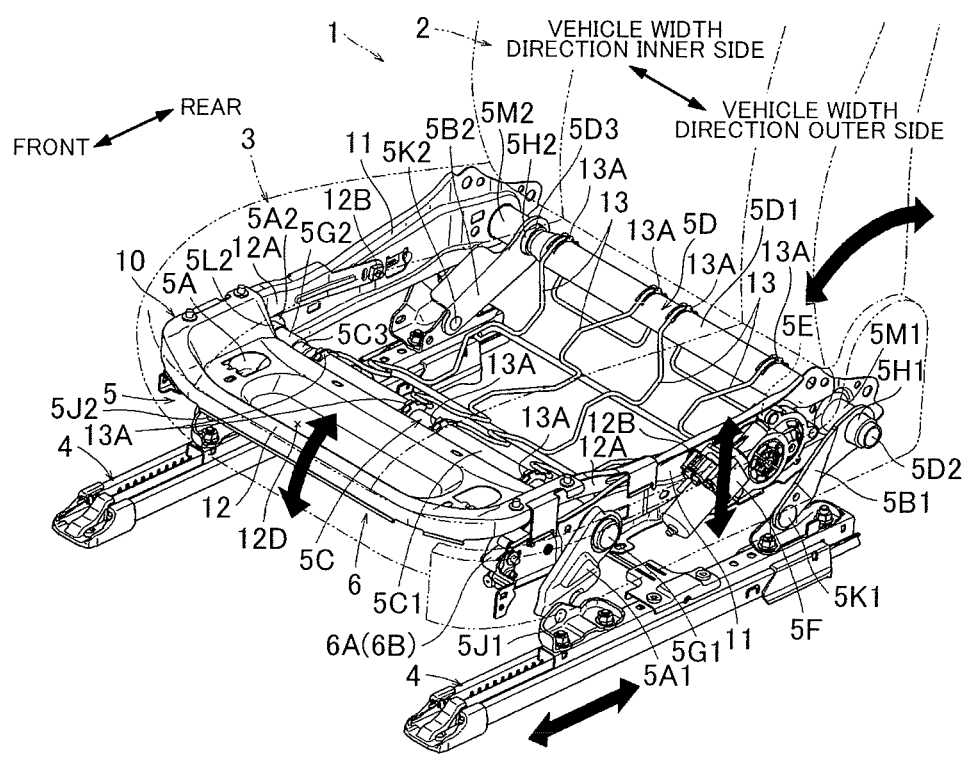
FIG. 1 is a perspective view showing a schematic configuration of a vehicle seat of a first embodiment.

First, the configuration of a vehicle seat 1 of a first embodiment will be described with reference to FIGS. 1 to 6. As shown in FIG. 1, the vehicle seat 1 is configured as a left-side front seat of an automobile and includes a seat back 2 serving as a backrest for a seated occupant and a seat cushion 3 serving as a seating portion. The vehicle seat 1 is a so-called "power seat" so that the backrest angle of the seat back 2 and the seating position of the seat cushion 3 can be electrically adjusted by operating corresponding switches (not shown).

Specifically, lower end portions on both left and right sides of the seat back 2 are respectively coupled to rear end portions on both left and right sides of the seat cushion 3 via electrically operated recliners (not shown). With this configuration, the backrest angle of the seat back 2 is normally held fixed by the recliners, while it can be adjusted in the vehicle front-rear direction by operating the switch (not shown) to electrically operate the recliners. The seat cushion 3 is joined to a floor of the vehicle via a pair of left and right electrically operated slide rails 4. With this configuration, the seating position of the seat cushion 3 in the vehicle front-rear direction is normally held fixed by the slide rails 4, while it can be adjusted by operating the switch (not shown) to electrically operate the slide rails 4.

An electrically operated seat lifter 5 is provided between the seat cushion 3 and the slide rails 4. With this configuration, the height position of the seat cushion 3 is normally held fixed by the seat lifter 5, while it can be adjusted by operating the switch (not shown) to electrically operate the seat lifter 5. Further, an electrically operated tilt mechanism 6 is provided at a front portion of the seat cushion 3. With this configuration, the support angle of the front portion, supporting the femoral regions of the seated occupant, of the seat cushion 3 is normally held fixed by the tilt mechanism 6, while it can be adjusted in the height direction by operating the switch (not shown) to electrically operate the tilt mechanism 6.

As described above, the vehicle seat 1 enables 8-direction or 8-way adjustment operations, i.e. the adjustment operations for the backrest angle of the seat back 2 (front and rear two directions), the adjustment operations for the seating position of the seat cushion 3 (front and rear two directions and up and down two directions), and the adjustment operations for the support angle of the front portion of the seat cushion 3 (up and down two directions). These adjustment operations are electrically performed by operating the switches (not shown) provided, for example, at predetermined positions of a side portion of the seat cushion 3 on its outer side in the vehicle width direction (on the right as facing the sheet of FIG. 1).

Figure 2:
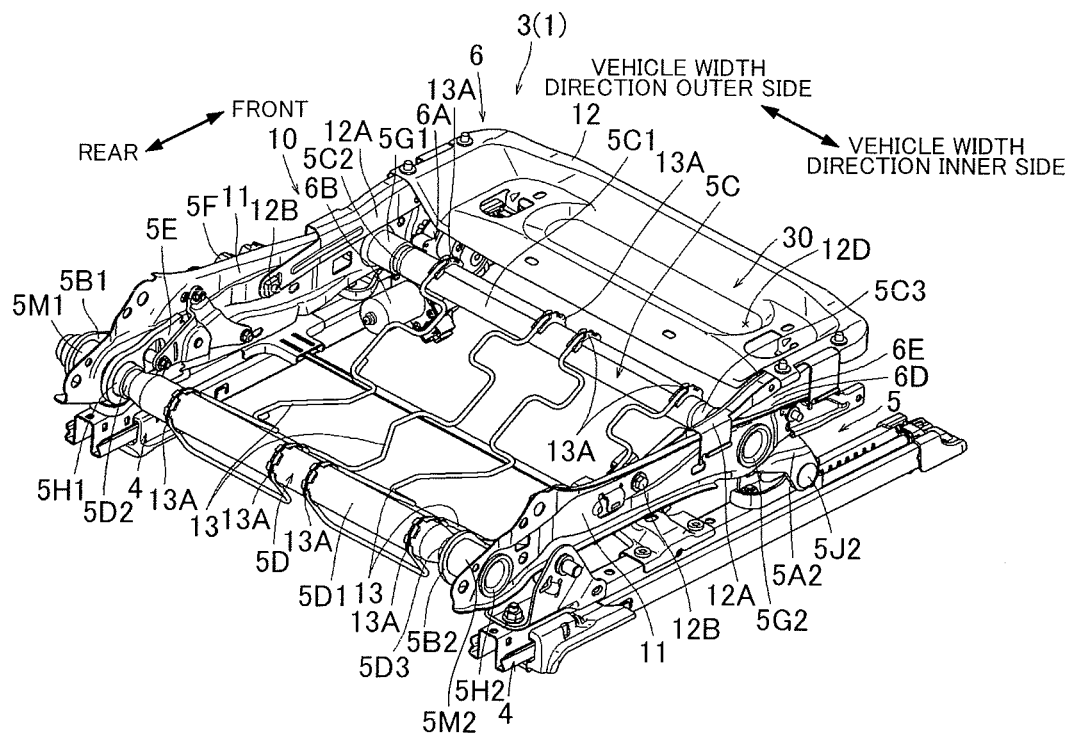
FIG. 2 is a perspective view of a cushion frame as seen from the rear inside of a vehicle.

As shown in FIGS. 1 and 2, the seat lifter 5 includes a pair of left and right front links 5A1 and 5A2 and a pair of left and right rear links 5B1 and 5B2 which are rotatably coupled to side frames 11 of the seat cushion 3 and to the slide rails 4 on the floor. Herein, the side frames 11 each exemplify a "seat frame" of the invention and the front links 5A1 and 5A2 and the rear links 5B1 and 5B2 each exemplify a "lifter link" of the invention. The seat lifter 5 forms, with its front links 5A1 and 5A2 and rear links 5B1 and 5B2, a pair of left and right four-bar linkage mechanisms capable of lifting up and down the seat cushion 3 with respect to the floor by a link motion.

As shown in FIGS. 1, 2, and 4 to 6, the front links 5A1 and 5A2 and the rear links 5B1 and 5B2 each have an upper end portion rotatably coupled to the corresponding side frame 11 via a corresponding one of steel bushings 5G1 and 5G2, 5H1 and 5H2 each having a shape of a hollow cylinder. Specifically, the bushings 5G1 and 5G2 coupling the upper end portions of the front links 5A1 and 5A2 to the corresponding side frames 11 are respectively fitted into the upper end portions of the front links 5A1 and 5A2 in an axial direction (seat width direction) and integrally welded thereto, while the bushings 5G1 and 5G2 are respectively inserted through the corresponding side frames 11 in the axial direction so as to be rotatable relative thereto. Likewise, the bushings 5H1 and 5H2 coupling the upper end portions of the rear links 5B1 and 5B2 to the corresponding side frames 11 are respectively fitted into the upper end portions of the rear links 5B1 and 5B2 in an axial direction (seat width direction) and integrally welded thereto, while the bushings 5H1 and 5H2 are respectively inserted through the corresponding side frames 11 in the axial direction so as to be rotatable relative thereto.

Figure 4:
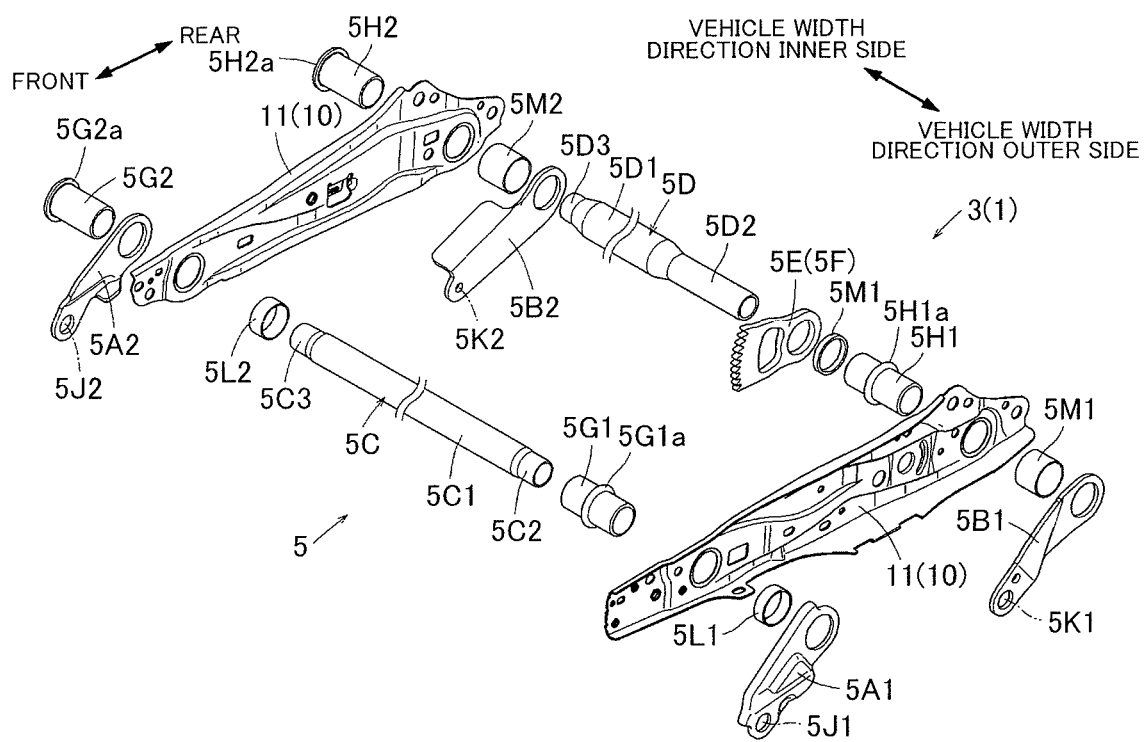
FIG. 4 is an exploded perspective view of the main part of the cushion frame.
Figure 5:
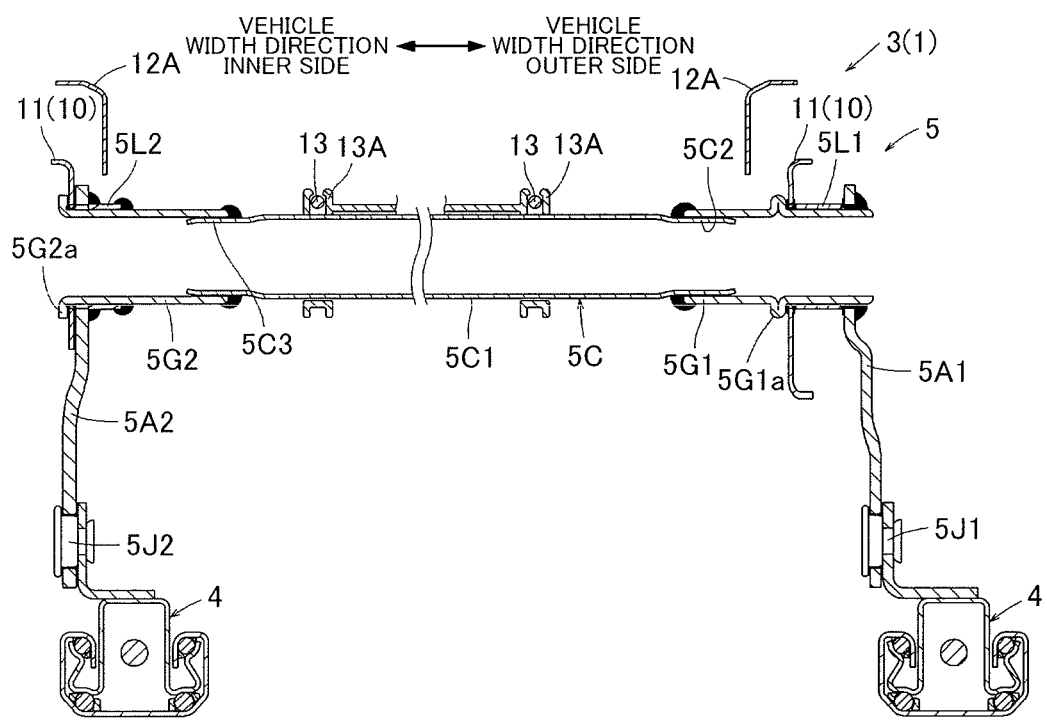
FIG. 5 is a sectional view taken along line V-V of FIG. 3.

The upper end portions of the front links 5A1 and 5A2 are integrally coupled to each other via a tubular steel front pipe 5C and the upper end portions of the rear links 5B1 and 5B2 are integrally coupled to each other via a tubular steel rear pipe 5D. Herein, the front pipe 5C and the rear pipe 5D each exemplify a "pipe" of the invention. Specifically, as shown in FIGS. 4 and 5, the front pipe 5C has at its both ends fitting portions 5C2 and 5C3 each formed in a diameter-reduced shape and the diameter-reduced fitting portions 5C2 and 5C3 are respectively fitted into the hollow cylinders of the bushings 5G1 and 5G2 coupling the upper end portions of the front links 5A1 and 5A2 to the corresponding side frames 11 and are integrally welded thereto. Likewise, the rear pipe 5D has at its both ends fitting portions 5D2 and 5D3 each formed in a diameter-reduced shape and the diameter-reduced fitting portions 5D2 and 5D3 are respectively fitted into the hollow cylinders of the bushings 5H1 and 5H2 coupling the upper end portions of the rear links 5B1 and 5B2 to the corresponding side frames 11 and are integrally welded thereto.

With this configuration, the front links 5A1 and 5A2 are integrally rotatable with each other via the front pipe 5C and the rear links 5B1 and 5B2 are integrally rotatable with each other via the rear pipe 5D. This makes it possible to strongly support the side frames 11 from the lower side by flexural rigidity and torsional rigidity exhibited by the front pipe 5C and the rear pipe 5D. Therefore, in order for the front pipe 5C and the rear pipe 5D to exhibit such support rigidities (flexural rigidity and torsional rigidity), the outer diameters of body portions 5C1 and 5D1 of the front pipe 5C and the rear pipe 5D are set greater than the inner diameters of the bushings 5G1 and 5G2 and the bushings 5H1 and 5H2, thereby ensuring high structural strength of the front pipe 5C and the rear pipe 5D.

Since both end portions (the fitting portions 5C2 and 5C3 and the fitting portions 5D2 and 5D3) of the front pipe 5C and the rear pipe 5D are formed in the diameter-reduced shapes that can be respectively fitted into the hollow cylinders of the bushings 5G1 and 5G2 and the hollow cylinders of the bushings 5H1 and 5H2, the front pipe 5C and the rear pipe 5D, even if configured to be able to exhibit high support rigidities as described above, can be coupled to the bushings 5G1 and 5G2 and the bushings 5H1 and 5H2 while being fitted into the hollow cylinders thereof. The front links 5A1 and 5A2 and the rear links 5B1 and 5B2 are attached in advance to the corresponding side frames 11 via the bushings 5G1 and 5G2 and the bushings 5H1 and 5H2 to form left and right assemblies, and then, the front pipe 5C and the rear pipe 5D are fitted into the bushings 5G1 and 5G2 and the bushings 5H1 and 5H2 to couple the left and right assemblies to each other, thereby producing a single assembly.

Figure 3:
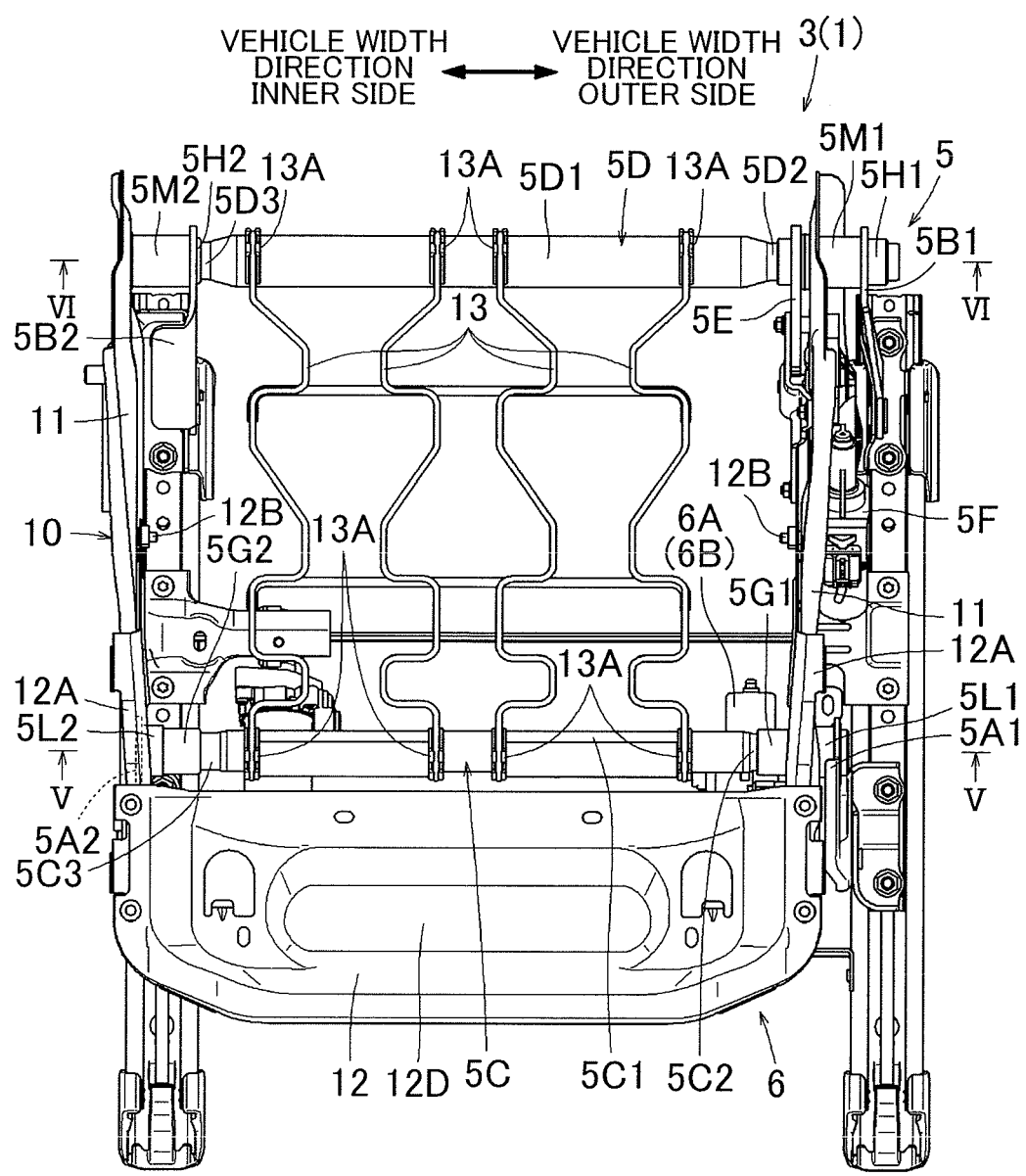
FIG. 3 is a plan view of the cushion frame.

Hereinbelow, specific configurations of the respective portions of the seat cushion 3 will be described in detail. As shown in FIGS. 1 to 3, the seat cushion 3 includes a metal cushion frame 10 forming its skeleton, wherein the cushion frame 10 is assembled in a rectangular frame shape following the outer peripheral shape of the seat cushion 3. Specifically, the cushion frame 10 includes the pair of left and right side frames 11 and a front panel 12 bridged between front end portions of the side frames 11 and configured to support the femoral regions of the seated occupant from the lower side, and further, the tubular steel front pipe 5C and the tubular steel rear pipe 5D are respectively bridged between front portions of the side frames 11 and between rear portions of the side frames 11, so that the cushion frame 10 is assembled in a rectangular frame shape as a whole in plan view. Although an urethane foam cushion pad (not shown) capable of relieving a load received from the seated occupant and a cloth cushion cover (not shown) covering the entire surface of the seat cushion 3 are placed on the upper side of the cushion frame 10, a description of specific configurations thereof will be omitted.

The side frames 11 are each in the form of a single pressed steel plate cut into a shape elongated in the vehicle front-rear direction and are disposed so as to face each other in the seat width direction. Each side frame 11 has a shape in which its upper and lower edge portions are bent toward the seat outer side so that the structural strength against bending and twisting is enhanced.

Like the side frames 11, the front panel 12 is in the form of a single pressed steel plate cut into a shape elongated in the seat width direction and is disposed so as to face the seat upper side. The front panel 12 has a shape in which its edge portion on the front side and its edge portions on both left and right sides are bent toward the seat lower side so as to enhance the structural strength against bending and twisting and further to prevent those edges from protruding toward the seat upper and outer peripheral sides where the occupant is seated.

At a central portion of an upper surface of the front panel 12, a recess 12D for receiving an airbag unit (not shown) is formed in a shape elongated in the seat width direction. The airbag unit (not shown) is configured to prevent the occupant from slipping toward the vehicle front side in the event of a front collision of the vehicle. Side portions on both left and right sides of the front panel 12 are respectively shaft-coupled to intermediate portions in the vehicle front-rear direction of the side frames 11 so as to be rotatable in the height direction about rotation shafts 12B (pins) via elongated tilt panels 12A extending from the front panel 12 toward the seat rear side.

Each tilt panel 12A is in the form of a single pressed steel plate cut into a shape elongated in the vehicle front-rear direction and is disposed in a direction so that its surface overlaps an inner surface of the corresponding side frame 11. Each tilt panel 12A has a shape in which its upper edge portion is bent toward the seat outer side so that the structural strength against bending and twisting is enhanced. The bent upper edge portion, i.e. the top plate portion, of each tilt panel 12A is located right above the upper edge portion, bent toward the seat outer side, of the corresponding side frame 11 and is applied to a corresponding one of edge portions on both left and right sides of the front panel 12 from the lower side and integrally riveted thereto.

Rear end portions of the tilt panels 12A are rotatably shaft-coupled to the intermediate portions of the side frames 11 via the rotation shafts 12B (pins). The rotation shafts 12B are disposed coaxially with each other. With this configuration, the front panel 12 is rotatable in the height direction about the rotation shafts 12B. Accordingly, the tilt mechanism 6 is formed that can change the support angle of the front panel 12 in the height direction to thereby adjust the support angle for supporting the femoral regions of the seated occupant. Tilt-up and tilt-down operations for rotating the front panel 12 in the height direction are performed by driving a driving device 6A provided at an inner side portion of the side frame 11 on the vehicle outer side, i.e. on the right as facing the sheet of FIG. 1.

Next, the configuration of the seat lifter 5 will be described. As shown in FIGS. 1 to 6, the seat lifter 5 includes the pair of left and right front links 5A1 and 5A2 and the pair of left and right rear links 5B1 and 5B2 which are interposed between the side frames 11 of the seat cushion 3 and the slide rails 4 on the floor. The seat lifter 5 further includes the hollow cylindrical steel bushings 5G1 and 5G2 coupling the upper end portions of the front links 5A1 and 5A2 to the corresponding side frames 11 so as to be rotatable relative thereto. The seat lifter 5 further includes the hollow cylindrical steel bushings 5H1 and 5H2 coupling the upper end portions of the rear links 5B1 and 5B2 to the corresponding side frames 11 so as to be rotatable relative thereto. The seat lifter 5 further includes rotation shafts 5J1 and 5J2 coupling lower end portions of the front links 5A1 and 5A2 to upper portions of the corresponding slide rails 4 so as to be rotatable relative thereto (see FIG. 5). The seat lifter 5 further includes rotation shafts 5K1 and 5K2 coupling lower end portions of the rear links 5B1 and 5B2 to upper portions of the corresponding slide rails 4 so as to be rotatable relative thereto (see FIG. 6).

The seat lifter 5 further includes the tubular steel front pipe 5C integrally coupling to each other the bushings 5G1 and 5G2 coupling the upper end portions of the front links 5A1 and 5A2 to the corresponding side frames 11 (see FIG. 5). The seat lifter 5 further includes the tubular steel rear pipe 5D integrally coupling to each other the bushings 5H1 and 5H2 coupling the upper end portions of the rear links 5B1 and 5B2 to the corresponding side frames 11 (see FIG. 6). The seat lifter 5 further includes a gear link 5E configured to transmit a rotational driving force or a braking force to the rear link 5B1 via the bushing 5H1. The seat lifter 5 further includes a driving device 5F configured to carry out power transmission to the gear link 5E to rotate or stop rotation of the gear link 5E. The seat lifter 5 further includes hollow cylindrical steel spacers 5L1 and 5L2 respectively fitted over the front-side bushings 5G1 and 5G2 to regulate the fitting positions of the front links 5A1 and 5A2 with respect to the bushings 5G1 and 5G2 (see FIG. 5). The seat lifter 5 further includes hollow cylindrical steel spacers 5M1 and 5M2 respectively fitted over the rear-side bushings 5H1 and 5H2 to regulate the fitting positions of the rear links 5B1 and 5B2 with respect to the bushings 5H1 and 5H2. Herein, the gear link 5E exemplifies a "driving force transmission member" of the invention.

As shown in FIGS. 1, 2, 4, and 5, of the front links 5A1 and 5A2, the front link 5A1 disposed on the vehicle outer side is disposed at a position on the seat outer side with respect to the side frame 11 on the same side, while the front link 5A2 disposed on the vehicle inner side is disposed at a position on the seat inner side with respect to the side frame 11 on the same side. Specifically, as shown in FIG. 5, for the front link 5A1 disposed on the vehicle outer side, its upper end portion is fitted over an end portion on the seat outer side of the bushing 5G1 inserted through the side frame 11 from the seat inner side toward the seat outer side and is integrally welded thereto. The bushing 5G1 is formed at its intermediate portion in the axial direction with a flange portion 5G1a whose outer peripheral portion protrudes in a ring shape, and is inserted into the side frame 11 from the seat inner side to a position where the flange portion 5G1a abuts against a side surface on the seat inner side of the side frame 11. The spacer 5L1 is fitted over a portion, protruding toward the seat outer side from the side frame 11, of the bushing 5G1 so that the upper end portion of the front link 5A1 is fitted to the bushing 5G1 at a position spaced apart from the side frame 11 toward the seat outer side by a dimension of the spacer 5L1 and is integrally welded thereto. With this configuration, the front link 5A1 and the bushing 5G1 are integrally joined to each other and attached to the side frame 11 with no backlash in the seat width direction and with no possibility of coming-off.

On the other hand, for the front link 5A2 disposed on the vehicle inner side, its upper end portion is, from the seat inner side, fitted to the bushing 5G2, inserted through the side frame 11 from the seat outer side toward the seat inner side, at a position where the upper end portion of the front link 5A2 abuts against a side surface on the seat inner side of the side frame 11. The bushing 5G2 is formed at its end on the seat outer side with a flange portion 5G2a whose outer peripheral portion protrudes in a ring shape, and is inserted into the side frame 11 from the seat outer side to a position where the flange portion 5G2a abuts against a side surface on the seat outer side of the side frame 11. The upper end portion of the front link 5A2 and then the spacer 5L2 are fitted over a portion, protruding toward the seat inner side from the side frame 11, of the bushing 5G2. Then, the front link 5A2 and the spacer 5L2 are integrally welded to each other and further the spacer 5L2 and an outer peripheral portion of the bushing 5G2 are integrally welded to each other so that the bushing 5G2 and the upper end portion of the front link 5A2 are integrally joined to each other. With this configuration, the front link 5A2 and the bushing 5G2 are integrally joined to each other and attached to the side frame 11 with no backlash in the seat width direction and with no possibility of coming-off.

Figure 6:
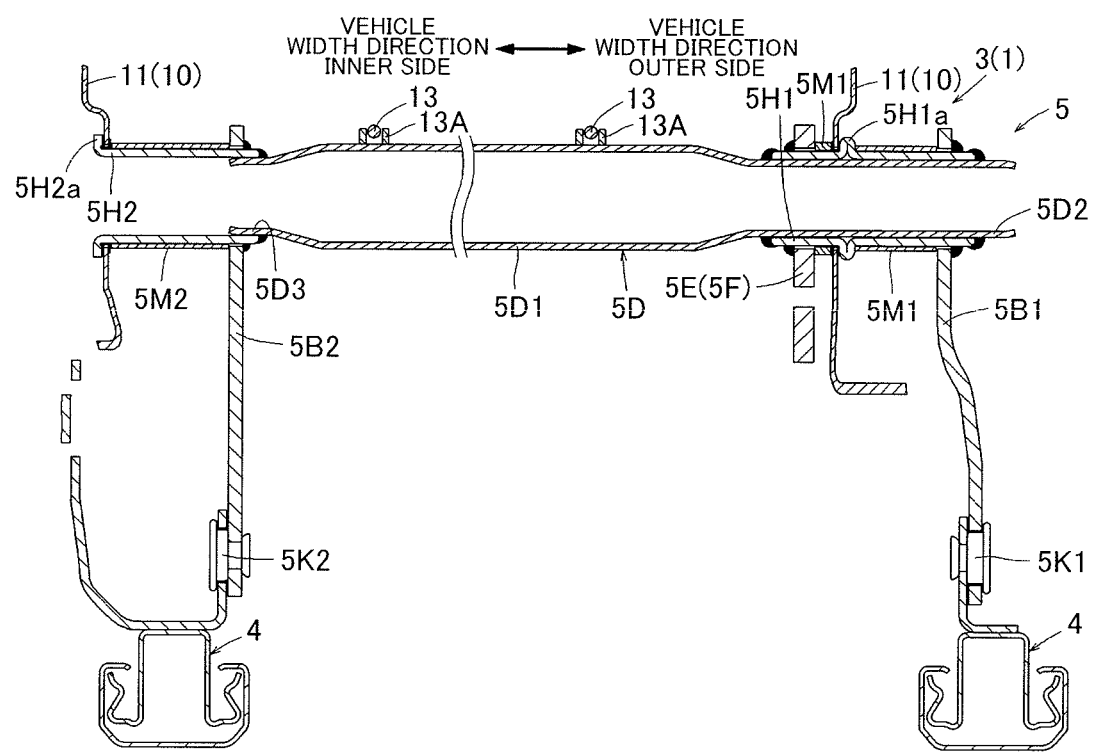
FIG. 6 is a sectional view taken along line VI-VI of FIG. 3.

As shown in FIGS. 1, 2, 4, and 6, of the rear links 5B1 and 5B2, the rear link 5B1 disposed on the vehicle outer side is disposed at a position on the seat outer side with respect to the side frame 11 on the same side, while the rear link 5B2 disposed on the vehicle inner side is disposed at a position on the seat inner side with respect to the side frame 11 on the same side. Specifically, as shown in FIG. 6, for the rear link 5B1 disposed on the vehicle outer side, its upper end portion is fitted over an end portion on the seat outer side of the bushing 5H1 inserted through the side frame 11 from the seat outer side toward the seat inner side and is integrally welded thereto. The bushing 5H1 is formed at its intermediate portion in the axial direction with a flange portion 5H1a whose outer peripheral portion protrudes in a ring shape, and is inserted into the side frame 11 from the seat outer side to a position where the flange portion 5H1a abuts against a side surface on the seat outer side of the side frame 11. The spacer 5M1 is fitted over a portion, protruding toward the seat outer side from the side frame 11, of the bushing 5H1 so that the upper end portion of the rear link 5B1 is fitted to the bushing 5H1 at a position spaced apart from the side frame 11 toward the seat outer side by a dimension of the spacer 5M1 and is integrally welded thereto.

Further, the gear link 5E is fitted over a portion, protruding toward the seat inner side from the side frame 11, of the bushing 5H1 and is integrally welded thereto. The gear link 5E is fitted over the protruding portion of the bushing 5H1 after a spacer 5M1 different from the above-described spacer 5M1 is fitted over that protruding portion so that the gear link 5E is fitted and integrally welded to the bushing 5H1 at a position spaced apart from the side frame 11 toward the seat inner side by a dimension of the spacer 5M1. With this configuration, the rear link 5B1, the bushing 5H1, and the gear link 5E are integrally joined to each other and attached to the side frame 11 with no backlash in the seat width direction and with no possibility of coming-off.

On the other hand, for the rear link 5B2 disposed on the vehicle inner side, its upper end portion is fitted over an end portion on the seat inner side of the bushing 5H2 inserted through the side frame 11 from the seat outer side toward the seat inner side and is integrally welded thereto. The bushing 5H2 is formed at its end on the seat outer side with a flange portion 5H2a whose outer peripheral portion protrudes in a ring shape, and is inserted into the side frame 11 from the seat outer side to a position where the flange portion 5H2a abuts against a side surface on the seat outer side of the side frame 11. The spacer 5M2 is fitted over a portion, protruding toward the seat inner side from the side frame 11, of the bushing 5H2 so that the upper end portion of the rear link 5B2 is fitted to the bushing 5H2 at a position spaced apart from the side frame 11 toward the seat inner side by a dimension of the spacer 5M2 and is integrally welded thereto. With this configuration, the rear link 5B2 and the bushing 5H2 are integrally joined to each other and attached to the side frame 11 with no backlash in the seat width direction and with no possibility of coming-off.

In the following manner, the front pipe 5C and the rear pipe 5D are respectively fitted and coupled to the front-side bushings 5G1 and 5G2 and the rear-side bushings 5H1 and 5H2 which are attached to the side frames 11, shown in FIGS. 1 to 4, as described above. As shown in FIG. 5, in the front pipe 5C, the body portion 5C1 forming its body shape is formed in a hollow cylindrical shape having an outer diameter (fitting diameter) greater than an inner diameter (fitting diameter) of the bushings 5G1 and 5G2. However, the front pipe 5C has, at both ends in the axial direction of the body portion 5C1, the diameter-reduced fitting portions 5C2 and 5C3 formed by swaging. The fitting portions 5C2 and 5C3 are each formed in a diameter-reduced hollow cylindrical shape that can be fitted into the hollow cylinder of the corresponding bushing 5G1, 5G2. The fitting portions 5C2 and 5C3 of the front pipe 5C are fitted into the hollow cylinders of the corresponding bushings 5G1 and 5G2 from the seat inner side and, in this state, the fitted entire peripheral edge portions are welded together so that the front pipe 5C is firmly and integrally joined to the bushings 5G1 and 5G2.

Likewise, as shown in FIG. 6, in the rear pipe 5D, the body portion 5D1 forming its body shape is formed in a hollow cylindrical shape having an outer diameter (fitting diameter) greater than an inner diameter (fitting diameter) of the bushings 5H1 and 5H2. However, the rear pipe 5D also has, at both ends in the axial direction of the body portion 5D1, the diameter-reduced fitting portions 5D2 and 5D3 formed by swaging. The fitting portions 5D2 and 5D3 are each formed in a diameter-reduced hollow cylindrical shape that can be fitted into the hollow cylinder of the corresponding bushing 5H1, 5H2. The fitting portions 5D2 and 5D3 of the rear pipe 5D are fitted into the hollow cylinders of the corresponding bushings 5H1 and 5H2 from the seat inner side and, in this state, the fitted entire peripheral edge portions are welded together so that the rear pipe 5D is firmly and integrally joined to the bushings 5H1 and 5H2.

The fitting portion 5D2, fitted into the bushing 5H1 on the vehicle outer side, of the rear pipe 5D is inserted through the bushing 5H1 to a position protruding from the bushing 5H1 toward the seat outer side. Further, also at a portion, protruding toward the seat outer side from the bushing 5H1, of the fitting portion 5D2, the fitted entire peripheral edge portions of the bushing 5H1 and the fitting portion 5D2 are welded together. With this configuration, a wide area in the axial direction, where the gear link 5E and the rear link 5B1 are coupled to the bushing 5H1, of the bushing 5H1 is reinforced from the inner peripheral side by the fitting portion 5D2 of the rear pipe 5D. By this reinforcement, the bushing 5H1 is configured to be able to exhibit high torsional rigidity for transmitting the power from the gear link 5E to the rear link 5B1. Further, even if a large load is input to the vehicle seat 1 to apply a large torsional load to the bushing 5H1 relative to the gear link 5E and relative to the rear link 5B1 in the state where a braking force is applied to the gear link 5E so that movement of the rear link 5B1 is stopped, the bushing 5H1 is configured to be able to exhibit high structural strength that can prevent the occurrence of large deformation, such as causing sinking of the vehicle seat 1, due to such a load.

As shown in FIGS. 1 to 3, the seat lifter 5 is configured such that, by a rotational driving force or a braking force transmitted from the gear link 5E on the vehicle outer side to the rear link 5B1 via the bushing 5H1 on the same side, the rear links 5B1 and 5B2 and the front links 5A1 and 5A2 on the respective sides are simultaneously swung in the vehicle front-rear direction or stopped in motion, thereby adjusting or fixing the height position of the seat cushion 3. The seat lifter 5 is configured such that the front links 5A1 and 5A2 are integrally coupled to each other via the front pipe 5C, while the rear links 5B1 and 5B2 are integrally coupled to each other via the rear pipe 5D. With this configuration, the seat lifter 5 is capable of exhibiting high support rigidities (flexural rigidity and torsional rigidity) such that, by a force to stop rotation of or rotate the rear link 5B1 on the vehicle outer side, the rear link 5B2 on the vehicle inner side can also support or raise the side frame 11 on the same side from the lower side.

As shown in FIGS. 5 and 6, of the slide rails 4, the slide rail 4 disposed on the vehicle inner side is disposed substantially right below the side frame 11 on the same side, while the slide rail 4 disposed on the vehicle outer side is disposed at a position offset outward (seat outer side) from the side frame 11 on the same side. Therefore, the installation interval between the slide rails 4 in the seat width direction is wide.

However, even if the installation interval between the slide rails 4 is greater than that between the side frames 11 as described above, the front link 5A1 and the rear link 5B1 disposed on the vehicle outer side are located outward (seat outer side) from the side frame 11 on the same side and coupled to the portions, extending toward the seat outer side from the side frame 11 on the same side, of the bushings 5G1 and 5H1 as described above. Therefore, without additionally providing a separate component such as a bracket for compensating the dimensional difference in the seat width direction between the side frames 11 and the slide rails 4 on the same sides, the front links 5A1 and 5A2 and the rear links 5B1 and 5B2 can be easily attached between the side frames 11 and the slide rails 4 having such a dimensional difference.

As shown in FIGS. 1 to 3, four metal support springs 13 (S-springs) arranged side by side in the seat width direction are extended between the front pipe 5C and the rear pipe 5D in the vehicle front-rear direction for widely and elastically receiving from the lower side the cushion pad (not shown) placed on the upper side of the cushion frame 10 of the seat cushion 3. Each support spring 13 is bent in a wavy shape in the seat width direction and its end portions on the front and rear sides are hooked over the front pipe 5C and the rear pipe 5D from the upper side via resin caps 13A. With this configuration, even if the front pipe 5C and the rear pipe 5D are axially rotated by the operation of the seat lifter 5, each support spring 13 does not follow the axial rotation movement of the front pipe 5C and the rear pipe 5D, but escapes such movement so as to be constantly held in a tensioned state with a certain posture between the front pipe 5C and the rear pipe 5D.

As described above, according to the configuration of this embodiment, the front pipe 5C and the rear pipe 5D (pipes) having high structural strength can be respectively attached to the bushings 5G1 and 5G2 and the bushings 5H1 and 5H2 which are attached to the side frames 11 (seat frames).

In the seat lifter 5, the bushing 5H1 coupling the rear link 5B1 (drive link) on the vehicle outer side, configured to receive transmission of a rotational driving force from the gear link 5E (driving force transmission member), to the side frame 11 so as to be rotatable is configured as follows. That is, the bushing 5H1 is integrally joined to the rear link 5B1 on the vehicle outer side and rotatably coupled to the side frame 11. The fitting portion 5D2 of the rear pipe 5D is inserted in the axial direction to the coupling position of the rear link 5B1 in the hollow cylinder of the bushing 5H1 and both end portions of the fitting area of the fitting portion 5D2 are welded to the bushing 5H1. In this manner, by inserting the fitting portion 5D2 of the rear pipe 5D in the coupling area, with the rear link 5B1, of the bushing 5H1 and integrally joining the fitting portion 5D2 to the bushing 5H1, the structural strength of such an area, where a large load is applied when a large load is input to the vehicle seat 1, can be enhanced so that the posture of the vehicle seat 1 can be firmly held.

The rear link 5B1 on the vehicle outer side is integrally joined to the gear link 5E via the bushing 5H1 with the side frame 11 interposed therebetween. The fitting portion 5D2 of the rear pipe 5D is inserted in the axial direction to the position passing through the coupling position of the gear link 5E and the coupling position of the rear link 5B1 in the hollow cylinder of the bushing 5H1 and both end portions of the fitting area of the fitting portion 5D2 are welded to the bushing 5H1. In this manner, by inserting the fitting portion 5D2 of the rear pipe 5D in the coupling areas, with the gear link 5E and the rear link 5B1, of the bushing 5H1 and integrally joining the fitting portion 5D2 to the bushing 5H1, the structural strength of such areas, where a torsional load is applied to the bushing 5H1 relative to the gear link 5E and relative to the rear link 5B1 when a large load is input to the vehicle seat 1, can be enhanced so that the posture of the vehicle seat 1 can be firmly held.

While the invention has been described with reference to one embodiment, the invention can be carried out in various embodiments in addition to the above-described embodiment. For example, "vehicle seat" of the invention can be applied to seats other than an automobile passenger seat and can also be widely applied to seats for other vehicles such as railway vehicles, trucks, buses, airplanes, and ships.

The configuration of the invention can be widely applied to a configuration of "a pipe is fitted to a bushing having a shape of a hollow cylinder and attached to a seat frame". Specifically, the bushing may be any bushing as long as it is attached to a frame forming a seat, such as a frame including and other than a side frame of a seat cushion or a frame of a seat back. In the above-described embodiment, the bushings are attached to the side frames of the seat cushion and the pipes (front pipe and rear pipe) are fitted to the bushings. However, the configuration of attaching to the bushing according to the invention may be employed at only one end of the pipe. The bushing may be a bushing for attaching to a seat frame a member for some use other than attaching a lifter link for a seat lifter to a side frame of a seat cushion.

A fitting portion of the pipe may be inserted to a position passing through the inside of the hollow cylinder of the bushing or to a midway position in the hollow cylinder of the bushing. As shown in the above-described embodiment, it is satisfactory if the fitting portion of the pipe is inserted to a position in the hollow cylinder of the bushing where required fitting is achieved. A drive link included in a plurality of lifter links for a seat lifter and configured to receive transmission of a rotational driving force so as to drive the other lifter links may be formed as a sector gear or the like and may receive transmission of a driving force from a driving device so as to be rotated. That is, a drive link and a driving force transmission member may be formed by a single member. In this case, by inserting the fitting portion of the pipe into the hollow cylinder of the bushing to a coupling position where the drive link is coupled to the bushing, and by welding both end portions of a fitting area of the fitting portion to the bushing, the structural strength of a power transmission path between the drive link and the pipe can be properly enhanced.

A fitting portion, formed at an end in an axial direction of a body portion, of the pipe may be fitted to the outer periphery of the bushing. Further, the fitting portion may be increased in diameter compared to the body portion and may be fitted to the inner periphery or the outer periphery of the bushing. That is, the configuration of the invention can be applied to a configuration in which the body portion of the pipe has a fitting diameter smaller than a fitting diameter of the bushing. In the case of a configuration in which the pipe is fitted to the outer periphery of the bushing, "fitting diameter" represents "outer diameter" of the bushing and "inner diameter" of the pipe, while in the case of a configuration in which the pipe is fitted to the inner periphery (into the hollow cylinder) of the bushing, "fitting diameter" represents "inner diameter" of the bushing and "outer diameter" of the pipe.

What is claimed is:

1. A vehicle seat comprising:
a seat frame including a side frame of a seat cushion;
a bushing having a hollow cylinder; and
a pipe that is fitted to the bushing and attached to the side frame, the pipe including:
a body portion that defines a hollow cylinder having an outer diameter greater than an inner diameter of the bushing; and
a fitting portion that is provided at an end in an axial direction of the body portion and that is fitted to an inner periphery of the bushing, the fitting portion defines a diameter-reduced hollow cylinder that is fitted into the hollow cylinder bushing at the inner periphery of the bushing; and
a plurality of lifter links rotatably coupled to the side frame and to a base on a floor, wherein
the bushing is a coupling shaft and at least one of the plurality of lifter links and the side frame are coupled to an outer periphery of the bushing such that the at least one lifter link is rotatable relative to the side frame, and
the fitting portion of the pipe is inserted into the hollow cylinder bushing in the axial direction through a coupling position of the at least one lifter link.

2. The vehicle seat according to claim 1, wherein
the at least one lifter link is a drive link configured to receive a rotational driving force so as to drive at least one other lifter link of the plurality of lifter links,
the bushing is integrally joined to the drive link and rotatably coupled to the side frame, and
both of end portions of a first fitting area of the fitting portion are welded to the bushing.

3. The vehicle seat according to claim 2, wherein
the drive link is integrally joined to a driving force transmission member via the bushing with the side frame interposed therebetween, and
the fitting portion of the pipe is inserted into the hollow cylinder bushing in the axial direction to a position passing through the coupling position of the drive link and a coupling position of the driving force transmission member, and
both end portions of a second fitting area of the fitting portion are welded to the bushing.

4. The vehicle seat according to claim 1, wherein
the pipe tapers from the body portion to the fitting portion.

5. The vehicle seat according to claim 1, wherein
the fitting portion of the pipe is inserted into the hollow cylinder bushing in the axial direction so as to extend over both the coupling position of the at least one lifter link and a coupling position of the side frame.

* * * * *